United States Patent
Broadbent

(10) Patent No.: US 11,780,283 B2
(45) Date of Patent: Oct. 10, 2023

(54) VEHICLE SUSPENSION AND DRIVE MECHANISM WITH VIRTUAL STEERING PIVOT

(71) Applicant: Applied Electric Vehicles Pty Ltd, Bayswater North (AU)

(72) Inventor: Julian Broadbent, Burwood (AU)

(73) Assignee: APPLIED ELECTRIC VEHICLES LTD, Scoresby Vic (AU)

( * ) Notice: Subject to any disclaimer, the term of this patent is extended or adjusted under 35 U.S.C. 154(b) by 0 days.

(21) Appl. No.: 17/293,265

(22) PCT Filed: Nov. 15, 2019

(86) PCT No.: PCT/AU2019/000142
§ 371 (c)(1),
(2) Date: May 12, 2021

(87) PCT Pub. No.: WO2020/097661
PCT Pub. Date: May 22, 2020

(65) Prior Publication Data
US 2022/0001712 A1  Jan. 6, 2022

(30) Foreign Application Priority Data

Nov. 15, 2018  (AU) ................ 2018904353

(51) Int. Cl.
*B60G 17/016* (2006.01)
*B60G 3/20* (2006.01)
*B60G 7/00* (2006.01)
*B62D 7/14* (2006.01)

(52) U.S. Cl.
CPC .......... *B60G 17/0162* (2013.01); *B60G 3/20* (2013.01); *B60G 7/005* (2013.01); *B60G 7/006* (2013.01);
(Continued)

(58) Field of Classification Search
CPC .............. B60G 2204/416; B60G 17/0162; B60G 3/20; B60G 2200/44; B60G 2204/182; B62D 7/146
See application file for complete search history.

(56) References Cited

U.S. PATENT DOCUMENTS

| 4,863,188 A | 9/1989 | Killian |
| 7,703,780 B2* | 4/2010 | Mizutani ............ B60G 3/20 |
| | | 280/124.144 |

(Continued)

FOREIGN PATENT DOCUMENTS

| DE | 202017001665 U1 * | 8/2018 |
| JP | 2008155694 A | 7/2008 |

(Continued)

OTHER PUBLICATIONS

JP 2012201342 A machine translation obtained from espacenet.com Mar. 2022.*

(Continued)

*Primary Examiner* — Paul N Dickson
*Assistant Examiner* — Maxwell L Meshaka
(74) *Attorney, Agent, or Firm* — TAROLLI, SUNDHEIM, COVELL & TUMMINO L.L.P.

(57) ABSTRACT

A suspension and drive mechanism for a steerable wheel of a vehicle, comprising a wheel support assembly supporting the wheel having a rolling axis and a wheel width defined by inner and outer wheel edges. Front and rear upper control arms coupled between a chassis and the wheel support assembly, and front and rear lower control arms between the chassis and the wheel support assembly. The front and rear upper control arms being coupled to the wheel support assembly above the rolling axis and inboard of the wheel inner edge, and front and rear lower control arms being coupled to the wheel support assembly below the rolling axis and inboard of the wheel inner edge. The control arms (Continued)

are angled so as to establish a virtual steering pivot axis for the wheel support assembly, the virtual steering pivot axis extending transverse of the rolling axis and located within the width of the wheel. The virtual steering pivot axis location varies according to a steering angle of the wheel support assembly as controlled by the steering arm. An electric drive unit arranged within the wheel for driving thereof, and at least one of the virtual pivots that lie on said virtual steering pivot axis lies within the volume occupied by the electric drive unit during at least one point in the steering travel of said wheel.

13 Claims, 7 Drawing Sheets

(52) U.S. Cl.
CPC .......... *B62D 7/146* (2013.01); *B60G 2200/44* (2013.01); *B60G 2204/182* (2013.01); *B60G 2204/416* (2013.01); *B60G 2300/50* (2013.01)

(56) References Cited

U.S. PATENT DOCUMENTS

| | | | |
|---|---|---|---|
| 9,216,624 B1 | 12/2015 | Luttinen et al. | |
| 9,731,572 B2* | 8/2017 | Tamura | B60G 15/062 |
| 10,501,117 B2* | 12/2019 | Ohba | B60G 3/26 |
| 10,518,808 B2* | 12/2019 | Brok | B62D 17/00 |
| 2007/0068715 A1* | 3/2007 | Mizutani | B60G 3/20 180/65.6 |
| 2009/0218783 A1* | 9/2009 | Brandl | B60G 7/008 280/124.135 |
| 2014/0020966 A1* | 1/2014 | Lee | B60K 17/046 180/55 |
| 2015/0151778 A1 | 6/2015 | Kageyama | |
| 2015/0360551 A1* | 12/2015 | Luttinen | B60K 17/04 180/292 |
| 2020/0122565 A1* | 4/2020 | Yamada | B60K 7/0007 |
| 2021/0276383 A1* | 9/2021 | Gordon | B60G 3/20 |

FOREIGN PATENT DOCUMENTS

| | | | | |
|---|---|---|---|---|
| JP | 2012201342 A | 10/2012 | | |
| WO | WO-2015008574 A1 * | 1/2015 | .............. | B60G 3/20 |
| WO | WO-2016170807 A1 * | 10/2016 | .............. | B60G 3/20 |

OTHER PUBLICATIONS

International Preliminary Report on Patentability dated Oct. 2, 2020 for corresponding International Application No. PCT/AU2019/000142.

* cited by examiner

VEHICLE SUSPENSION AND DRIVE MECHANISM WITH VIRTUAL STEERING PIVOT

FIELD

This invention relates to a suspension and drive mechanism for a steerable wheel of a vehicle. In particular, the invention is described with reference to an electrically powered vehicle.

BACKGROUND

Implementation of electrically powered vehicles for widespread road transportation presents numerous opportunities and challenges in vehicle design and engineering, even more so when considering fully- or semi-autonomous electric vehicles. One of the overriding opportunities is in exploiting potential efficiencies available to electrically powered vehicles. Some of the ways that electric road vehicles can be made to operate in a more efficient manner includes reducing overall vehicle weight, optimising efficiency of conversion from stored energy to vehicle movement (i.e. drivetrain efficiency), and optimising vehicle body size and interior space available for a given platform.

Electric drive units (drive assemblies) suitable for propelling road vehicles allow for greater flexibility in placement of the motor or motors within the vehicle. Whereas the size and complexity of an internal combustion engine requires the engine to be generally centralised (at least laterally) and drive two or more wheels through a mechanical transmission, more compact electric motors can be distributed in various ways within the vehicle structure. For example, a four wheel electric road vehicle may have an electric drive unit incorporated into each of the front and/or rear wheel assemblies, to drive the front and/or rear wheels directly. This arrangement can lead to enhanced efficiency through reduced mechanical transmission losses, as well as lower vehicle weight through reduced powertrain componentry.

Additionally, the two or four wheels on a vehicle used for steering require a substantial amount of space within the vehicle body envelope due to the arc of travel of the wheels as they travel from lock to lock according to the steering wheel input. This is particularly true with vehicle fitted with direct drive wheel motors fitted within the wheel that can limit the optimal placement of the steering pivot points.

When viewed from above, the envelope a wheel requires to steer is determined by the distance from the outermost point on the wheel to the pivot point, often known as the virtual king pin, about which the wheel assembly rotates during steering input.

If this pivot point ran through the centre of the tyre in a vertical plane then this distance would be minimised as the tyre would spin on its own axis, and the envelope required would also be at a minimum. In practice, it is difficult locate the pivot points in this position and for a conventional vehicle this placement gives rise to a range of poor vehicle handling characteristics, such as no self-centering and limited driver feedback.

Therefore the pivot point usually sits adjacent to the inside edge of the wheel defined by the king pin or steering arm location which means that the envelope required is not minimised due to the need to trade-off this space for vehicle steering and handling dynamics.

Ackermann steering takes this concept further by separating the steering movement into two pivots, one near the hub of each wheel to minimise tyre scrubbing during steering.

Suspension movement then introduces variations in camber and in directional alignment (toe-in or toe-out) to complicate this basic steering geometry, which is further compounded by castor angle, camber angle, king-pin inclination, and offset or scrub radius. Each one of these adjustments is designed to introduce or reduce certain vehicle handling characteristics at all expected vehicle speeds. Often any poor handling characteristics are amplified by the speed the vehicle is travelling at.

The combination of all these factors result in a significant area that needs to be provided for under the vehicle body to ensure the wheels can move freely from lock to lock without any binding against the vehicle chassis or bodywork.

Castor angle is introduced into traditional steering mechanisms to promote a degree of "self-centring" action into the steering. This helps with directional stability of the vehicle and reduces wandering. Improper castor settings will require the driver to move the steering wheel both into and out of each turn, making it difficult to maintain a straight line.

When vehicles are fitted with an electronically actuated steering configuration that is required for full autonomous control, the actuation of the steering input can fight with the natural self-centring behaviour giving rise to a hysteresis effect, especially as the vehicle returns to straight line direction from a turn. There is then a trade-off between how much the steering response is dampened to reduce the overshoot with the dynamic response of the steering to turn the vehicle quickly.

The overall dimensions of the vehicle become important for a range of reasons. With electric vehicles there are thresholds around speed of travel and size of vehicle that then dictate what design and compliance standards apply. It is challenging to maximise interior space while maintaining a compact vehicle size. Therefore, minimising the intrusion of wheel arches and the overall wheel envelope into the passenger area becomes vital to ensure the interior space can be fully utilised.

In consideration of the above, embodiments of the present invention aim to provide an improved suspension and drive mechanism for a steerable wheel of a vehicle, particularly insofar as applied to autonomous electric road vehicles.

SUMMARY

In accordance with an aspect of the present invention consists of a suspension and drive mechanism for a steerable wheel of a vehicle, comprising:

a wheel support assembly adapted for supporting said wheel of said vehicle having a rolling axis and a wheel width defined by inner and outer wheel edges;

front and rear upper control arms coupled between a chassis structure of said vehicle and said wheel support assembly;

front and rear lower control arms in use coupled between said vehicle chassis structure and said wheel support assembly; and a steering arm coupled between a steering control assembly and said wheel support assembly; said front and rear upper control arms and said front and rear lower control arms being coupled to said chassis structure and to said wheel support assembly by way of respective ball joints;

said front and rear upper control arms being coupled to said wheel support assembly above said rolling axis and inboard of said wheel inner edge;

said front and rear lower control arms being coupled to said wheel support assembly below said rolling axis and inboard of said wheel inner edge;

wherein said front and rear upper control arms and said front and rear lower control arms are angled so as to establish a virtual steering pivot axis for said wheel support assembly, said virtual steering pivot axis extending transverse of said rolling axis and located within the width of said wheel, and wherein said virtual steering pivot axis location varies according to a steering angle of said wheel support assembly as controlled by said steering arm; and an electric drive unit arranged within said steerable wheel for driving thereof, and at least one of the virtual pivots that lie on said virtual pivot axis lies within the volume occupied by electric drive unit during at least one point in the steering travel of said wheel.

Preferably said control arms are arranged to minimise the envelope within which said wheel requires to steer.

Preferably said control arms are arranged such that said virtual steering pivot axis remains substantially vertical above the contact patch of said wheel to minimise envelope within which said wheel requires to steer.

Preferably at the end of the steering rotation of said wheel said virtual pivots are substantially vertically above the centre of the contact patch of said wheel to minimise envelope said wheel requires to steer.

Preferably said virtual steering pivot axis point of contact with the ground translates backwards for the outside wheel of turn and translates forward for the inside wheel of turn relative to said wheel during steering to minimise envelope said wheel requires to steer.

Preferably the castor axis point of contact with the ground for said wheel can remain in substantially the same position when said wheel is straight or turned.

Preferably the virtual steering pivot axis change reduces vehicle drop effect and thereby reduces self-centering effects of the steering to minimised.

Preferably the varying of said virtual steering pivot axis reduces vehicle body roll effects by lifting the outside of said wheel in a turn.

Preferably in another embodiment said front and rear upper control arms are replaced by a wishbone suspension arm.

Preferably in another embodiment said front and rear lower control arms are replaced by a wishbone suspension arm.

Preferably in a further embodiment said front and rear upper control arms are replaced by a suspension strut rigidly attached to said wheel support assembly.

The advanced steering and suspension geometry allows for effective vehicle space utilisation for application in electric vehicles with two or four wheel that pivot for steering.

In embodiments the suspension mechanism is adapted for use with electric vehicles employing an in-wheel electric drive unit wherein space within the vehicle wheel that may ordinarily be utilised for placement of suspension couplings is constrained by placement of the in-wheel electric drive unit. The electric drive unit may include, but is not limited to a brake, gearbox, motor controller, cooling system as part of the assembly.

Embodiments of the invention aim to provide an advanced electric vehicle wheel suspension and steering geometry designed to minimise the space required to accommodate the wheels being steered within the vehicle body envelope. This disclosed system utilises advanced kinematic principles to introduce a variable pivot point which moves to ensure the resultant wheel position is at the most favourable location within the vehicle body envelope as the wheel moves through its arc during full lock to lock travel for a given steering angle.

By utilising a five-link suspension configuration, the length and connection points of each suspension element can be chosen to vary the virtual pivot point depending on how much steering angle has been introduced. A pair of lower suspension control arms and a pair of upper suspension control arms are combined with the steering arm to support and control the wheel position.

When viewed from above the virtual pivot point moves in a non-linear path of varying radius to optimise the wheel location within the vehicle body envelope. At the same time the rate of change of the Ackerman geometry is controlled for a given turn angle whilst maintaining control over castor/bump steer and other suspension dynamics.

The length of each control arm and the offset and location of the pivot point is carefully chosen to avoid any over travel, over centre or binding of the control arms.

Extrapolation of the upper and lower control arms create their own virtual pivot points at the effective intersection thereof, with a line between the virtual pivot points representing a virtual and variable king pin axis.

By adopting its most favourable position relative to the vehicle's body at any point of its travel, the envelope required to accommodate the wheel underneath the vehicle's body is reduced, allowing for highly efficient space utilisation, with resultant reduction in vehicle body size and overall weight.

A further refinement can be implemented for low speed autonomous vehicles wherein the geometry of the five-link suspension may be adjusted to remove any tendency to self-centre, whilst retaining its directional stability regardless of the steering angle. Coupling this suspension with an autonomous control allows for smooth operation of the steering especially back to centre with no noticeable hysteresis or overshot in steering wheel turn angle.

BRIEF DESCRIPTION OF THE DRAWINGS

Further disclosure, objects, advantages and aspects of the present invention may be better understood by those skilled in the relevant art by reference to the following description of preferred embodiments taken in conjunction with the accompanying drawings, which are given by way of illustration only and thus not limitative of the present invention, and in which.

DETAILED DESCRIPTION

An embodiment of an electric vehicle suspension and steering system is described hereinbelow with reference to the accompanying drawings. The suspension system as disclosed herein addresses:

Design and engineering of a five-link arrangement for creation of a virtual wheel pivot point. This arrangement allows for installation of an electric drive unit such as an in-wheel motor while also optimising vehicle handling characteristics related to torque-steer and bump steer;

Design and engineering of vehicle suspension mechanism and geometry to reduce the maximum dimensions of the wheel articulation envelope, allowing for efficient vehicle packaging where more space can be provided to the passenger compartment for the same vehicle length;

Design and engineering of suspension systems and geometry for variable weight jacking on the outboard side of the vehicle when steering. This provides enhanced vehicle stability, road holding and passenger comfort; and Steering geometry optimised for operation with 5 link suspension and in-wheel motor drive platforms (vehicle suspension).

Figure 1:
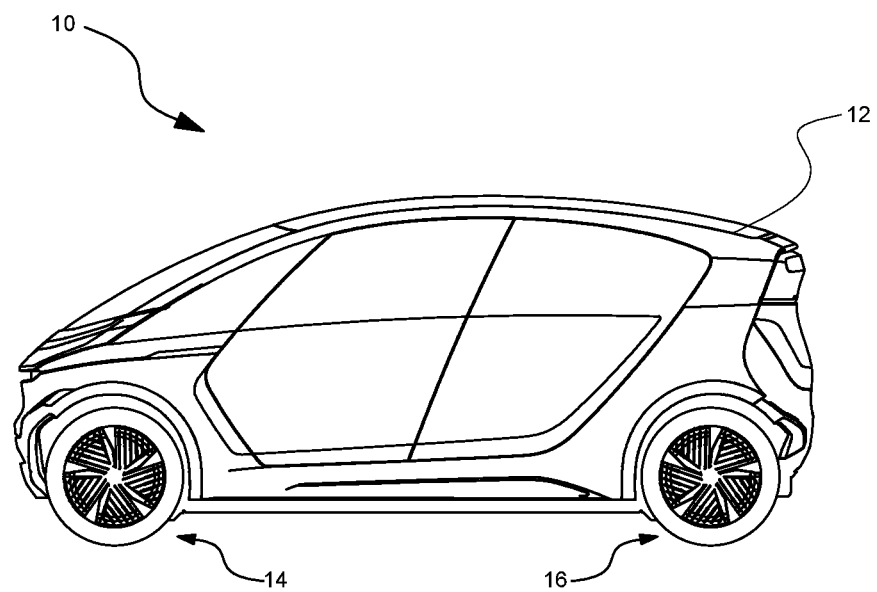
FIG. 1 is a side view of a vehicle suitable for implementation of a suspension system according to embodiments of the invention.

FIG. 1 is a side view of an exemplary vehicle 10 suitable for implementation of a suspension and steering system according to embodiments of the invention. Vehicle 10 has a chassis structure (not seen) and body 12 supported on front and rear wheels 14, 16. Vehicle 10 has electric drive units (assemblies) 30 mounted within each of the wheels 14, 16. Front wheels 14 are steerable in order to control direction of the vehicle in use, although it is possible for the rear wheels 16 to also be steerable to achieve enhanced maneuverability. In this example vehicle 10 comprises a compact and relatively lightweight passenger conveyance adapted for autonomous road operation. The suspension and steering system is thus designed with these constraints and features in mind.

Figure 2:
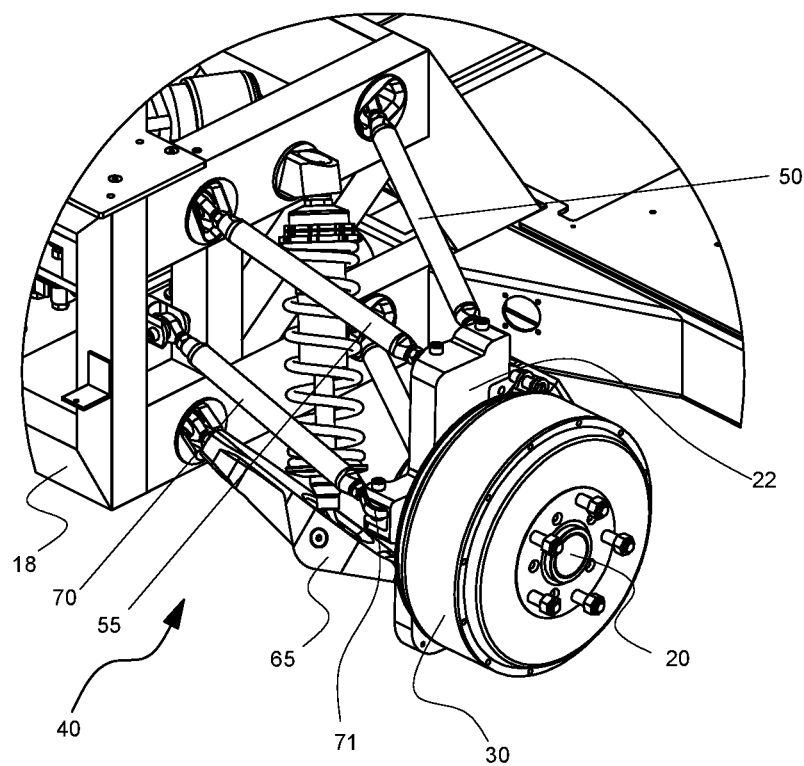
FIG. 2 is an elevated front perspective view of a suspension system according to an embodiment of the invention fitted to a vehicle chassis.

An elevated front perspective view of the suspension system according to an embodiment of the invention is shown in FIG. 2, is fitted to vehicle chassis 18 and with the respective wheel itself removed in order to reveal the suspension components. Vehicle suspension assembly 40 couples the wheel support assembly to the vehicle chassis 18. The wheel support assembly as shown includes a wheel hub 20, which incorporates an electric drive unit 30, and a hub support structure (upright) 22. The vehicle wheel is mounted on wheel hub 20 which in turn is mounted on upright 22.

Figure 3:
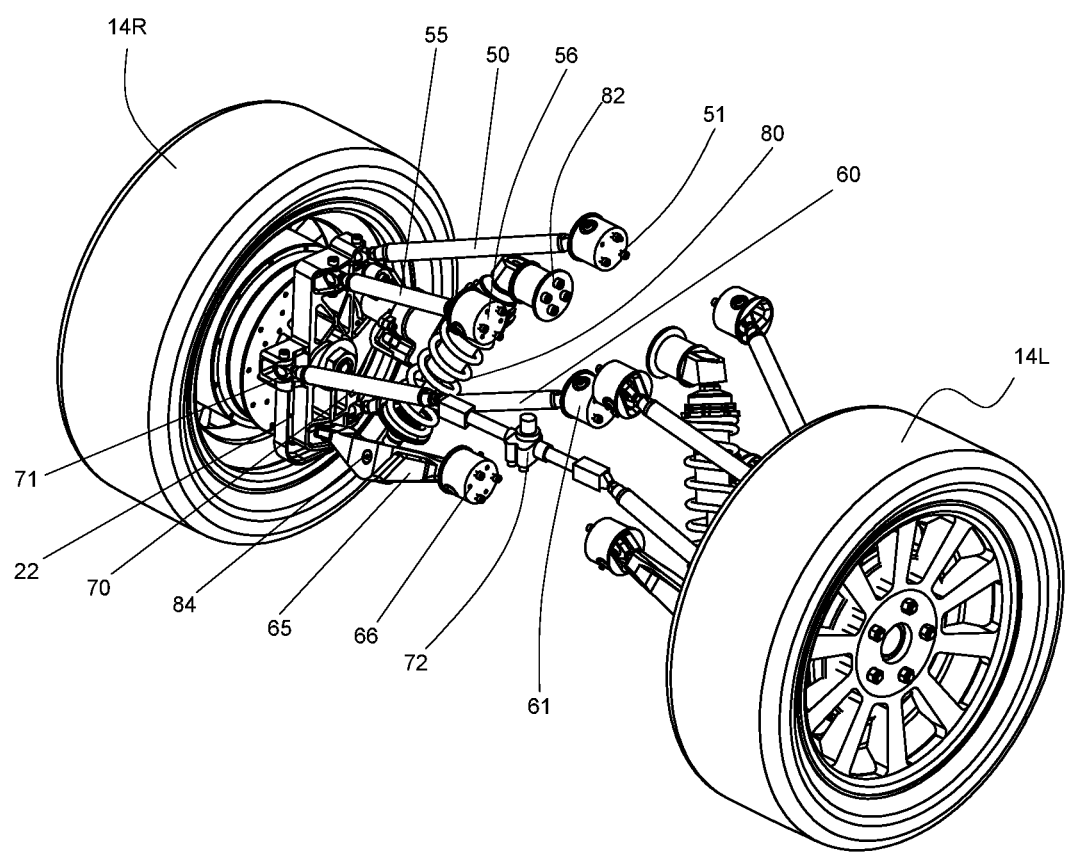
FIG. 3 is an elevated front perspective view of the suspension system according to an embodiment, showing associated wheels but divorced from the vehicle chassis and body.
Figure 4:
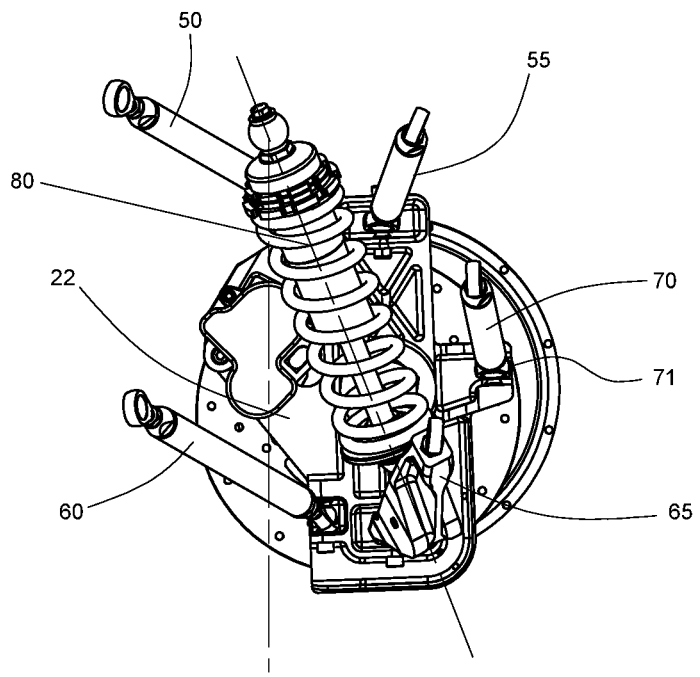
FIG. 4 is an inside elevation view of a suspension system according to an embodiment seen in isolation.
Figure 5:
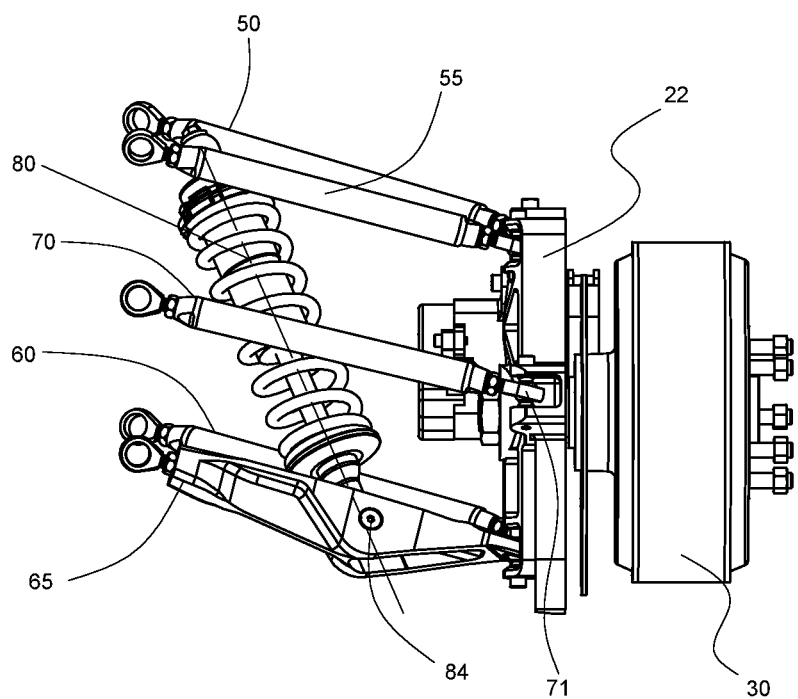
FIG. 5 is a front elevation view of the suspension system.
Figure 6:
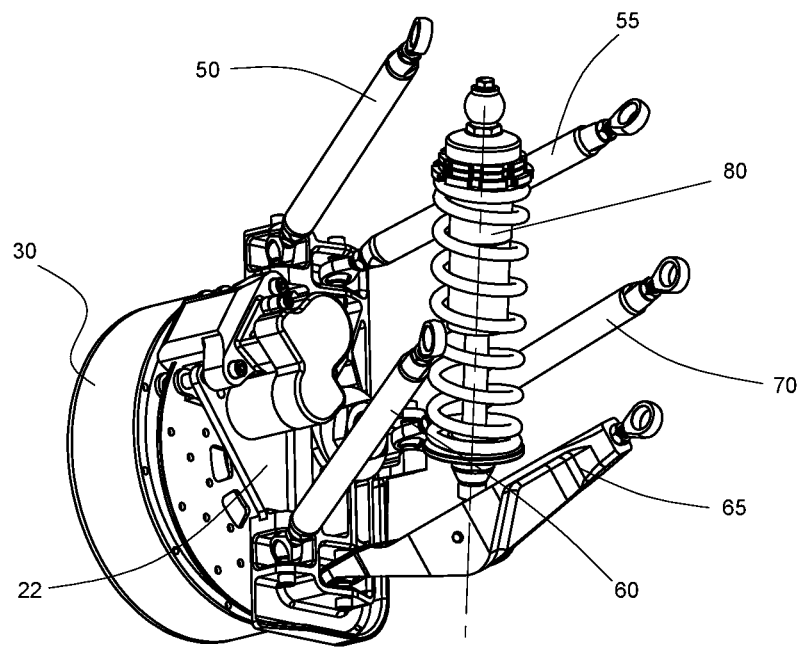
FIG. 6 is a lower front perspective view of the suspension system.

Suspension assembly 40 shown in FIG. 3, includes both left and right front suspension assemblies, showing the left and right wheels 14L, 14R but not the vehicle chassis. FIGS. 4 to 7 show various other views of the suspension assembly 40 in isolation.

Suspension assembly 40 comprises upper and lower pairs of control arms that couple the chassis 18 to the upright 22. Specifically, front and rear upper control arms 55, 50 couple the chassis to the upright above the rolling axis of the wheel, in use, and front and rear lower control arms 65, 60 couple the chassis to the upright below the wheel rolling axis. Front and rear upper control arms 55,50 have respective chassis mounts 56, 51 which incorporate ball joints to allow articulated movement of the control arms relative to the chassis mounts. The other ends of the front and rear upper control arms are coupled to upright 22 at mounts 57, 52 which also include ball joints. The front and rear lower control arms are similarly arranged below the wheel rolling axis, with respective chassis mounts 66, 61 and upright mounts 67, 62. A suspension strut assembly 80, for example including one or more springs and dampers, has a lower end coupled to the front lower control arm 65 at 84 and an upper end in use coupled to the chassis at 82. A steering arm 70 is also provided, extending between a steering control assembly 72 and a ball joint coupling 71 to the upright 22. The steering arm upright coupling 71 is positioned intermediate the upper and lower control arm mounts and offset from in a forward direction therefrom.

In this exemplary embodiment the upper and lower pairs of control arms are arranged in a substantially similar configuration, respectively above and below the wheel rolling axis. This arrangement is such that the upper and lower pairs of control arms each establish a respective virtual pivot point, wherein a line between these virtual pivot points represents a virtual and variable king-pin axis or steering axis.

Figure 8:
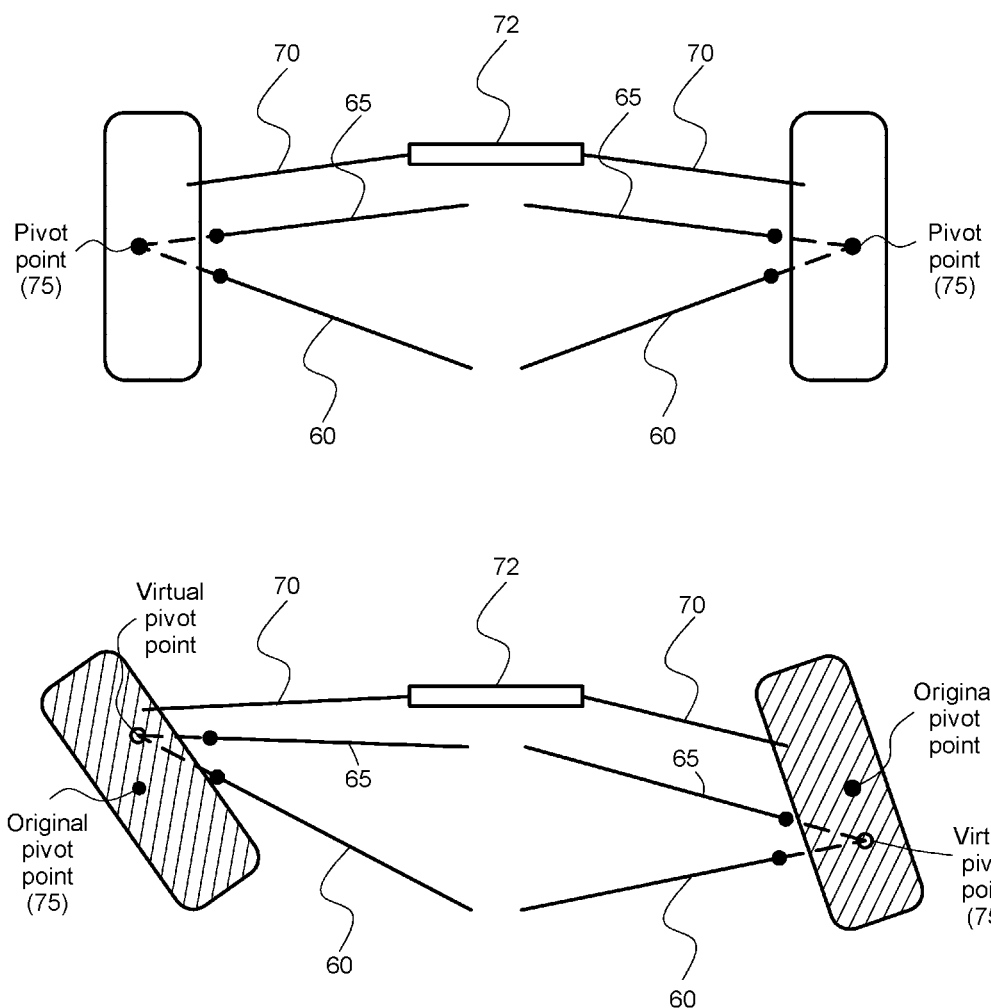
FIG. 8 is a diagrammatic illustration of virtual pivot point shifting according to embodiments of the invention seen from an overhead perspective.
Figure 9A:
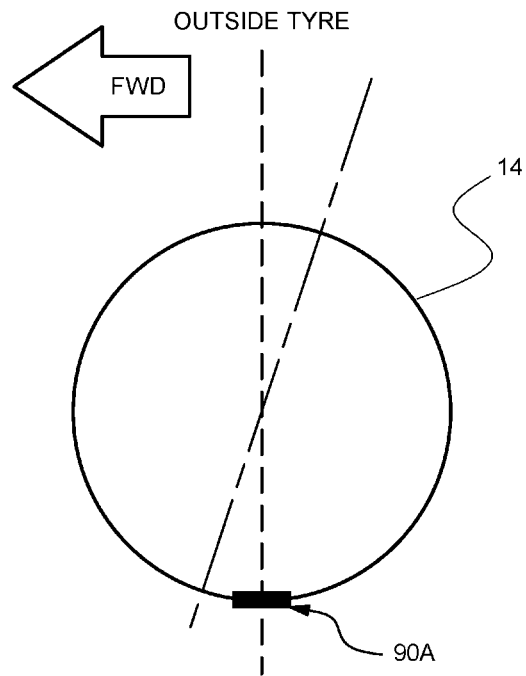
FIGS. 9A and 9B are diagrammatic illustrations of virtual pivot point shifting according to embodiments of the invention seen from a side perspective.
Figure 9A:
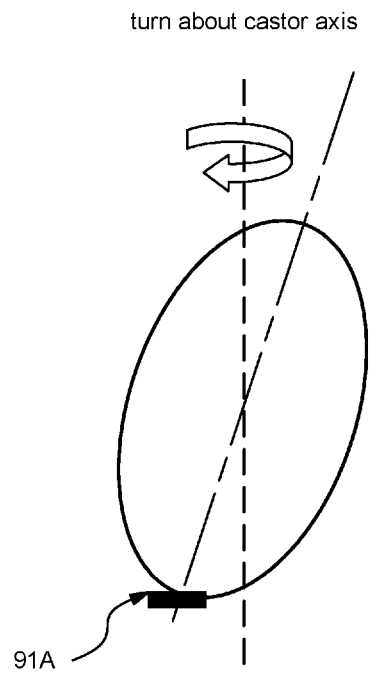
Figure 9B:
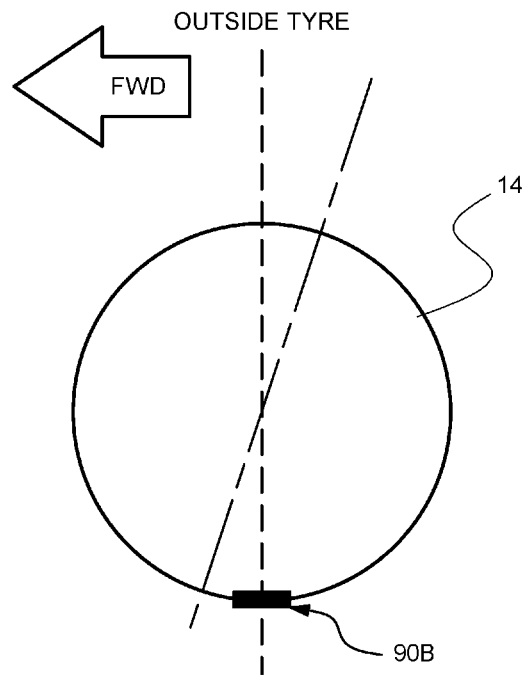
Figure 9B:
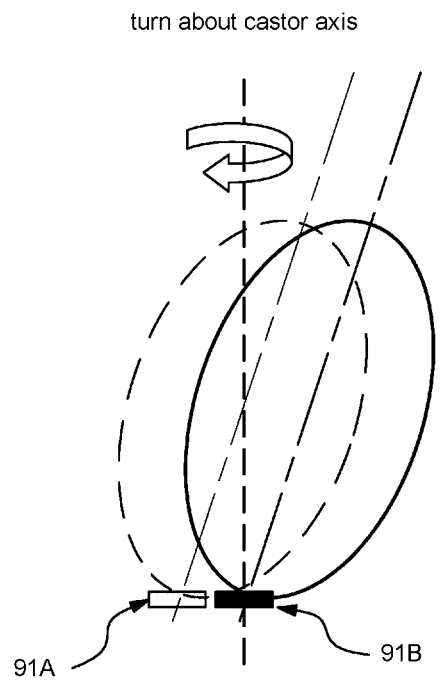
Figure 10:
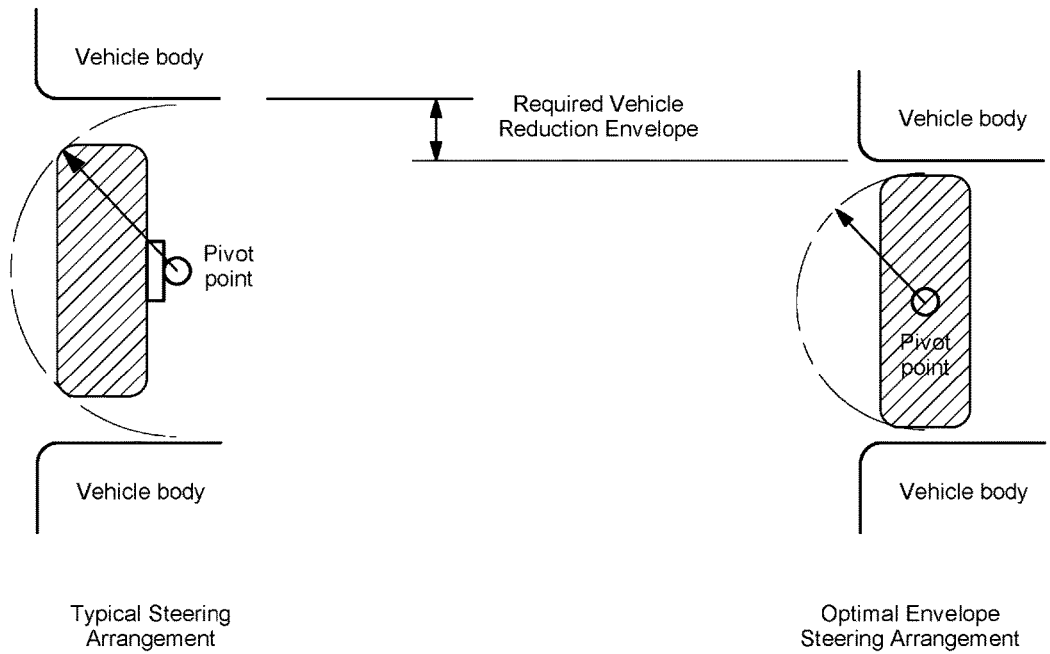
FIG. 10 is a diagrammatic illustration of optimised vehicle body steering envelope arrangement.

The effects of the suspension and steering geometry enabled by the suspension assembly according to embodiments of the invention are illustrated diagrammatically in FIGS. 8, 9 and 10.

In FIG. 8, the front wheels of vehicle 10 are shown in overhead view with diagrammatic illustrations of the lower control arms and steering arms. This drawing shows how the virtual pivot point established by the suspension assembly moves with steering input. The figure shows the steering axis point of contact with the ground translates backwards for outside wheel of the turn and translates forward for the inside wheel of the turn relative to the said wheels. By adopting its most favourable position relative to the vehicle body at any point of its travel, the envelope required to accommodate the wheel underneath the vehicle's body is reduced, allowing for highly efficient space utilisation, with resultant reduction in vehicle body size and overall weight. The geometry of the suspension assembly may be further refined to remove any tendency to self-centre, whilst retaining its directional stability regardless of the steering angle. When coupled with autonomous control this allows for smooth operation of the steering especially back to centre with no noticeable hysteresis or overshot in steering wheel turn angle.

FIG. 9 diagrammatically illustrates factors affecting vehicle dynamics, showing the front suspension constant load/effort with castor for high speed stability and camber change during steering angle change. FIG. 9A shows the case of a conventional suspension system wherein the point of contact moves forward of the wheel vertical centreline when steering, which creates a self-centring steering effect. The shifting point of contact can be seen by comparing the point of contact with the wheel pointed forward (90A) and the point of contact with the wheel direction turned (91A). In contrast, referring to FIG. 9B the suspension and steering system in embodiments of the present invention permits unique suspension geometry particularly suited to automated steering vehicles that, in steering, moves the wheel assembly rearward to reposition the steering point of contact (91B) at the original wheel vertical centre line. In other words, the point of contact with the wheel straight (90B) and turned (91B) can remain in substantially the same position relative to the castor axis. This arrangement can thus eliminate the self-centring effect and alters traditional driver feedback (which may be unnecessary and/or disadvantageous for an autonomously controlled vehicle), whilst still maintaining castor angle and the benefits thereof.

As well as addressing control and handling characteristics that may be applicable to autonomous vehicles, the suspension system according to embodiments of the invention can be used to optimize vehicle body allowances for steered wheel pivoting. This effect is illustrated in FIG. 10 which diagrammatically illustrates, on the left side, a typical steering arrangement for a vehicle wheel with in-wheel electric drive assembly and, on the right side, the optimal envelope steering arrangement made possible by embodiments of the present invention.

When viewed from above, the envelope a wheel requires is determined by the distance from the outermost point on the wheel to the pivot point, often known as the virtual king pin, about which the wheel assembly rotates during steering input. If this pivot point ran through the centre of the tyre in a vertical plane then this distance would be minimised as the tyre would spin on its own axis, and the envelope required would also be at a minimum. In practice, having the pivot point fixed in this position would traditionally be seen to provide a range of poor vehicle handling characteristics, but can be well suited to an automated steering vehicle. Therefore, the pivot point usually sits adjacent to the inside edge of the wheel defined by the king pin or steering arm location which means that the envelope required is not minimised due to the need to trade-off this space for vehicle steering and handling dynamics. The suspension and steering system as described herein, however, is able to optimize the vehicle body envelope required to accommodate the steered wheels while maintaining favourable vehicle handling characteristics.

Figure 11:
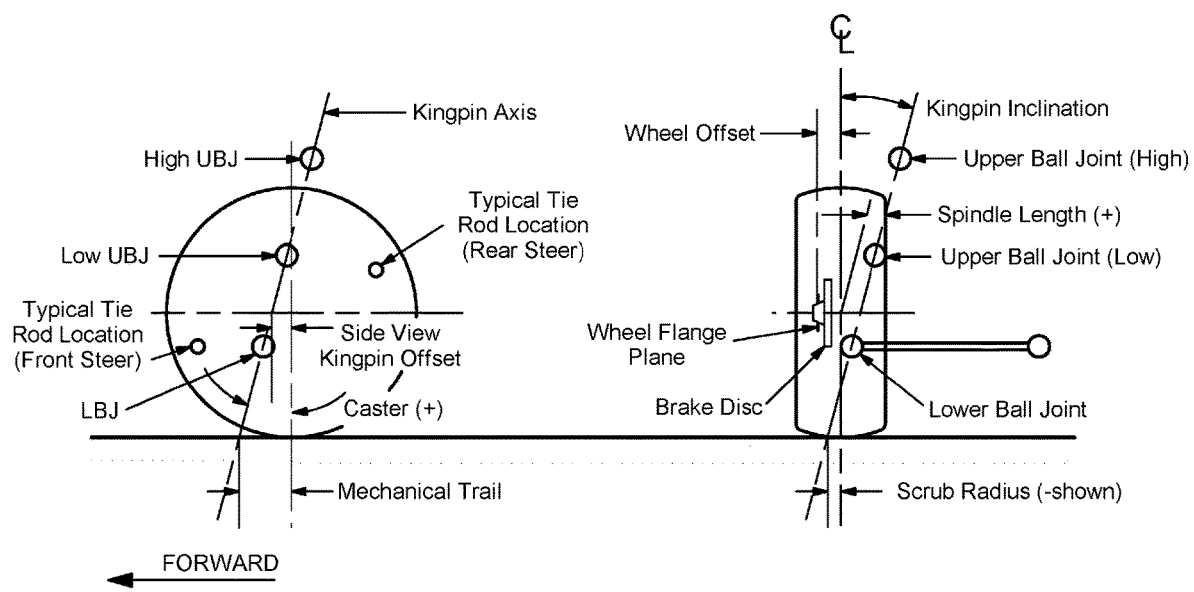
FIG. 11 is an annotated diagram of a wheel with conventional suspension mounting configuration.

FIG. 11 is a diagrammatic illustration of a vehicle wheel with conventional suspension configuration, annotated with applicable terminology as used herein and understood in the relevant field. Of note in the diagram is the 'scrub radius'. Reducing this to a sensible distance is a key feature of embodiments of the invention. Normally an in-wheel electric drive in combination with a brake assembly results in an extremely large scrub radius due to the constraints on placement of the wheel pivot mounts. Some scrub radius is normally desirable as under high load the tire would deflect to bring the scrub radius back closer to zero. Scrub radius is also suggested to provide some feedback under braking and acceleration. Larger scrub radius makes dry steering easier.

Also of note in the FIG. 11 diagram, is the lower ball joint (or virtual point), which is the most difficult to position for a wheel with an in-wheel electric drive unit with a hub motor and brake. As such the upper ball joint may in some cases be able to be provided by the end of a traditional wishbone with a physical single ball joint, but it is likely to be advantageous to create a virtual steering centre with a pair of control arms for the lower links. A further variation could be the use of the virtual centre on the lower arms in an Macpherson strut arrangement wherein the upper control arms are replaced by a suspension strut rigidly attached to the wheel support assembly. Following this same principle, the lower control arms could be replaced by a wishbone and the upper links could remain as a pair of control arms.

What should be understood is that a "virtual pivot axis" is created by a line passing through two (upper and lower) virtual pivot points. With reference again to FIG. 8, it diagrammatically shows, that whilst one of these virtual pivot points 75 varies according to a steering angle of wheel support assembly 40 (depicted in earlier FIG. 2), it would stay located within the width of a wheel 14 mounted on wheel support assembly 40. In the abovementioned embodiment, electric drive unit 30 is mounted within steerable wheel 14 via wheel support assembly 40, and at least one (of the two) virtual pivot points 75 for each wheel 14, lie within the volume occupied by electric drive unit 30 during at least one point in the steering travel. This feature of virtual pivot point 75 that lies within the volume occupied by electric drive unit 30 significantly contributes to the "optimal envelope steering arrangement" shown in FIG. 10, which is advantageous for optimising body size and interior space of vehicle 10, and even more advantageous where vehicle 10 is an autonomous electric road vehicle.

Figure 7:
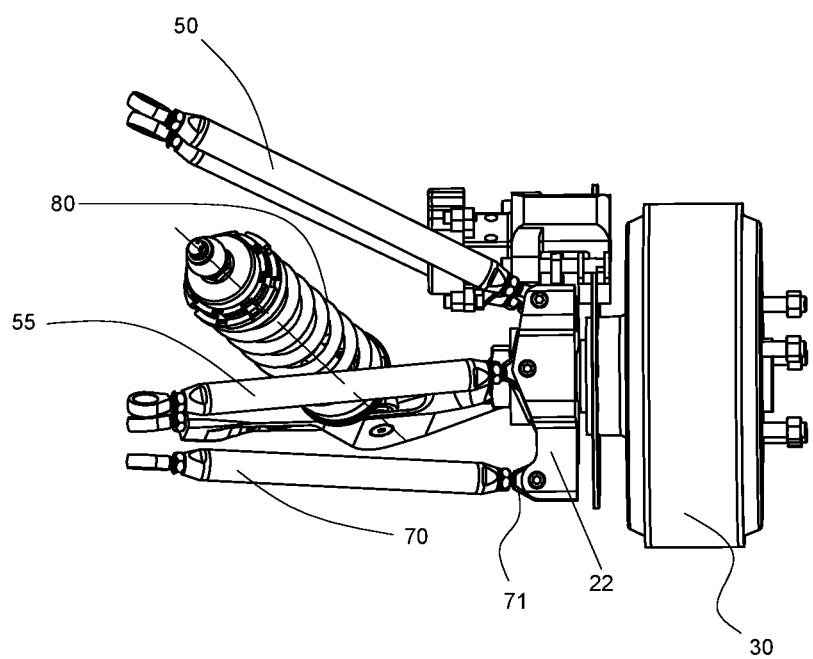
FIG. 7 is a front elevation view of the suspension system.

Another feature is that of self-levelling or jacking achieved through the geometry of the suspension mechanism in combination with the mounting position of suspension strut 80 to lower control arm 65 as shown in FIG. 7. FIG. 8 shows that as the outside wheel is steered lower control arm 65 rotates backwards for the outside wheel of the turn. As suspension strut 80 is mounted to this control arm 65, the act of this said backwards rotation causes the strut to rotate to a more upright position and in do so causes a lifting effect to this wheel assembly through both the shortening of the link distance and by increasing the rate or effective stiffness of strut 80, by making strut 80 act more perpendicularly to control arm 65. As a travelling vehicle 10 enters a turn, weight is transferred to the outside wheel causing it to droop and vehicle 10 to roll, in this embodiment, the geometry described above resists this rolling effect.

In the abovementioned embodiment, vehicle 10, has four steerable and electrically driven wheels 14,16. However, it should be understood that in a not shown embodiment, the vehicle may only have two of its wheels steerably and electrically driven.

The structure and implementation of embodiments of the invention has been described by way of non-limiting example only, and many additional modifications and variations may be apparent to those skilled in the relevant art without departing from the spirit and scope of the invention described.

Any discussion of documents, devices, acts or knowledge in this specification is included to explain the context of the invention. It should not be taken as an admission that any of the material forms part of the prior art base or common general knowledge in the relevant art in Australia or elsewhere on or before the priority date of the disclosure and claims herein.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The invention claimed is:

1. A suspension and drive mechanism for a steerable wheel of a vehicle, comprising:
   a wheel support assembly adapted for supporting said wheel having a rolling axis and a wheel width defined by inner and outer wheel edges;
   an upper support assembly connecting a chassis structure of said vehicle and said wheel support assembly;
   front and rear lower control arms in use coupled between said vehicle chassis structure and said wheel support assembly by respective first ball joints; and
   a steering arm coupled between a steering control assembly and said wheel support assembly by a coupling joint;
   said front and rear lower control arms being coupled to said wheel support assembly below said rolling axis and inboard of said wheel inner edge;
   wherein said upper support assembly establishes an upper steering pivot and said front and rear lower control arms are angled so as to establish a virtual steering pivot, said upper steering pivot and said lower virtual steering pivot form a virtual steering pivot axis extending transverse of said rolling axis and located within the width of said wheel, and wherein said virtual steering pivot axis location varies according to a steering angle of said wheel support assembly as controlled by said steering arm; and
   an electric drive unit arranged within said steerable wheel for driving thereof, and said lower virtual steering pivot within the volume occupied by electric drive unit during at least one point in the steering travel of said wheel.

2. A suspension and drive mechanism as claimed in claim 1, wherein said control arms are arranged to minimise the envelope within which said wheel requires to steer.

3. A suspension and drive mechanism as claimed in claim 1, whereby said control arms are arranged such that said virtual steering pivot axis remains substantially vertical above the contact patch of said wheel to minimise envelope within which said wheel requires to steer.

4. A suspension and drive mechanism as claimed in claim 1, whereby, at the end of the steering rotation of said wheel said pivots are substantially vertically above the centre of the contact patch of said wheel to minimise envelope said wheel requires to steer.

5. A suspension and drive mechanism as claimed in claim 1, wherein the steering axis point of contact with the ground translates backwards for the outside wheel of turn and translates forward for the inside wheel of turn relative to said wheel during steering to minimise envelope said wheel requires to steer.

6. A suspension and drive mechanism as claimed in claim 1, wherein the castor axis point of contact with the ground for said wheel can remain in substantially the same position when said wheel is straight or turned.

7. A suspension and drive mechanism as claimed in claim 1, wherein said virtual steering axis change reduces vehicle drop effect and thereby reduces self-centering effects of the steering to minimized, as compared to a vehicle without the suspension and drive mechanism of claim 1.

8. A suspension mechanism and drive as claimed in claim 1, wherein the varying of said virtual steering pivot axis reduces vehicle body roll effects by lifting the outside of said wheel in a turn, as compared to a vehicle without the suspension and drive mechanism of claim 1.

9. A suspension and drive mechanism as claimed in claim 1, wherein said upper support assembly comprises front and rear upper control arms coupled between said vehicle chassis structure and said wheel support assembly by respective second ball joints.

10. A suspension and drive mechanism as claimed in claim 9, wherein said upper steering pivot established by said upper support assembly is an upper virtual pivot, and said front and rear upper control arms are angled so as to establish said upper virtual pivot.

11. A suspension and drive mechanism as claimed in claim 10, wherein said upper virtual pivot lies within the volume occupied by said electric drive unit during at least one point in the steering travel of said wheel.

12. A suspension and drive mechanism as claimed in claim 1, wherein said upper support assembly comprises a wishbone suspension arm.

13. A suspension and drive mechanism as claimed in claim 1, wherein said upper support assembly comprises a suspension strut rigidly attached to said wheel support assembly.

* * * * *